United States Patent [19]
Frederiksen et al.

[11] Patent Number: 4,793,248

[45] Date of Patent: Dec. 27, 1988

[54] NUT SHELLING MACHINE

[76] Inventors: Wilfred C. Frederiksen, 16881 Bolero Ln., Huntington Beach, Calif. 92649; Sun Y. Kim, 2384 Lancaster Ct., Hayward, Calif. 94542

[21] Appl. No.: 156,327

[22] Filed: Feb. 16, 1988

[51] Int. Cl.⁴ .................................................. A23N 5/00
[52] U.S. Cl. .................................. 99/575; 99/576; 99/621
[58] Field of Search .................. 99/568, 574–576, 99/581, 582, 584, 585, 588, 590, 591, 593, 594, 621, 623, 624; 426/482, 483; 241/187, 230, 235

[56] References Cited

U.S. PATENT DOCUMENTS

| | | | |
|---|---|---|---|
| 3,889,583 | 6/1975 | Mizuno et al. | 99/576 |
| 4,073,032 | 2/1978 | Packwood | 99/574 |
| 4,462,309 | 7/1984 | Frazier | 99/621 X |
| 4,608,007 | 8/1986 | Wood | 241/235 X |
| 4,643,086 | 2/1987 | Christodoulou | 99/574 |
| 4,708,056 | 11/1987 | Dinanath | 99/575 |

Primary Examiner—Timothy F. Simone
Attorney, Agent, or Firm—Bielen and Peterson

[57] ABSTRACT

A nut shelling machine in which a rotary drive mechanism operates a rotary feed mechanism and a rotary shelling mechanism, the shelling mechanism having a frame with four shafts arranged in spaced, side by side, upper and lower pairs, the shafts having surface lobes and indentions for enlarging and contracting the effective space between the upper pair and lower pair of shaft for accepting and trapping a nut between the pair of upper shafts and lower shafts, where it is shelled by a shafting implement before the shell and nut passes between the pair of lower shafts.

17 Claims, 4 Drawing Sheets

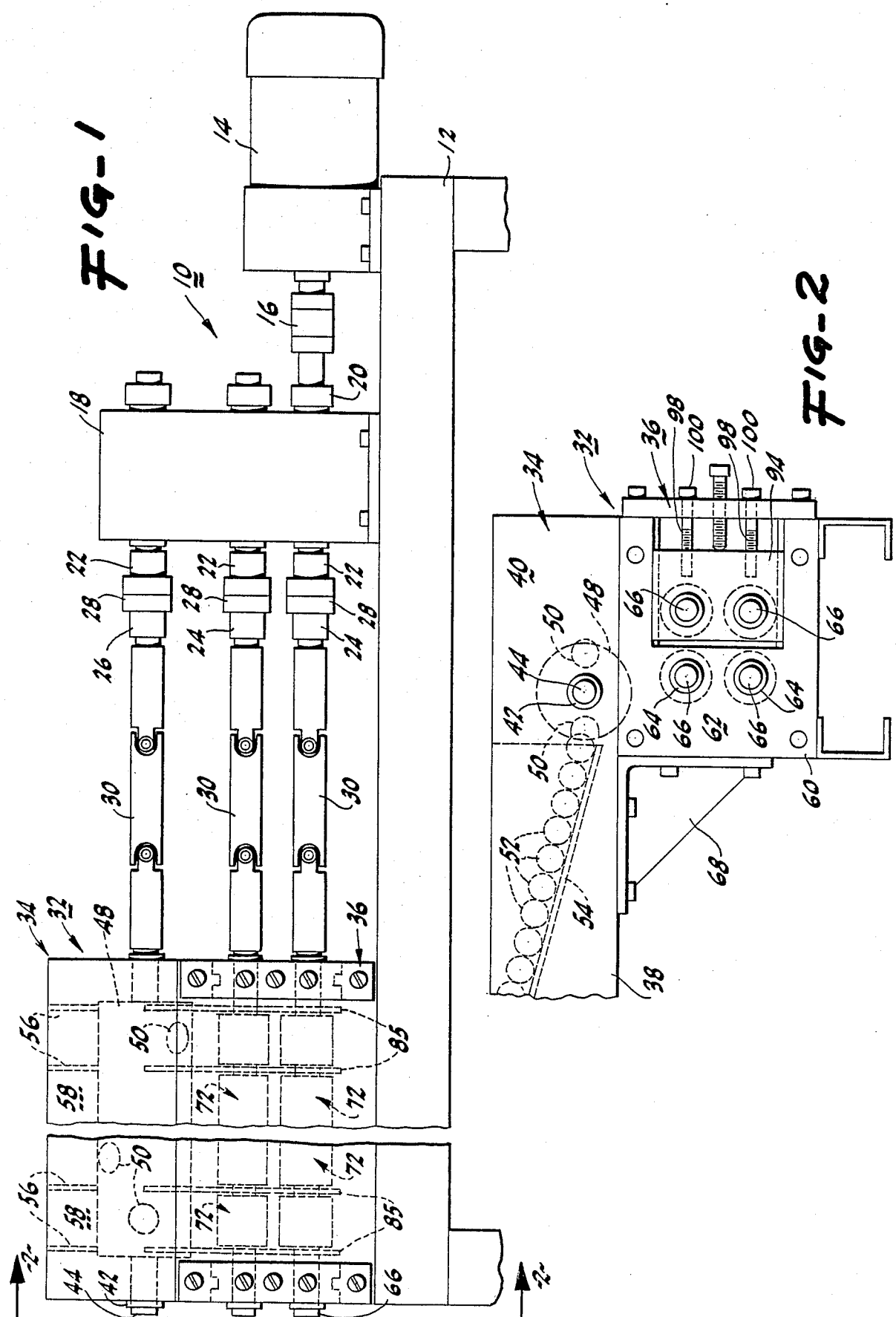

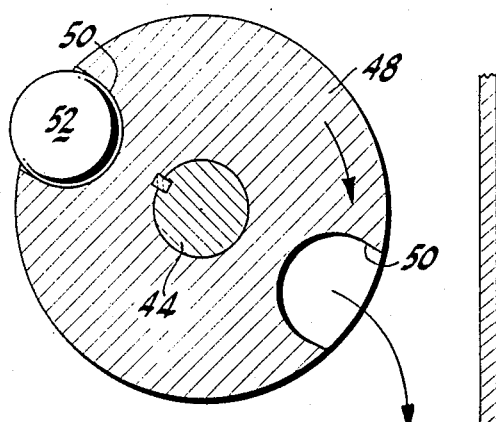
FIG.-3
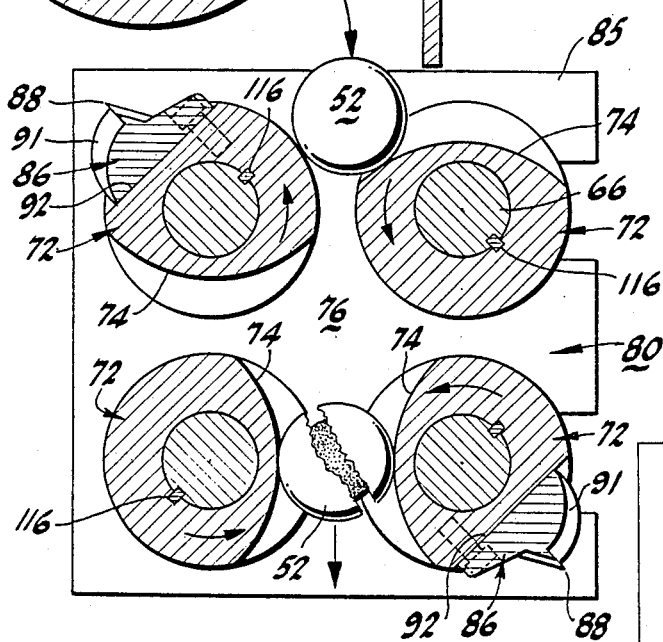
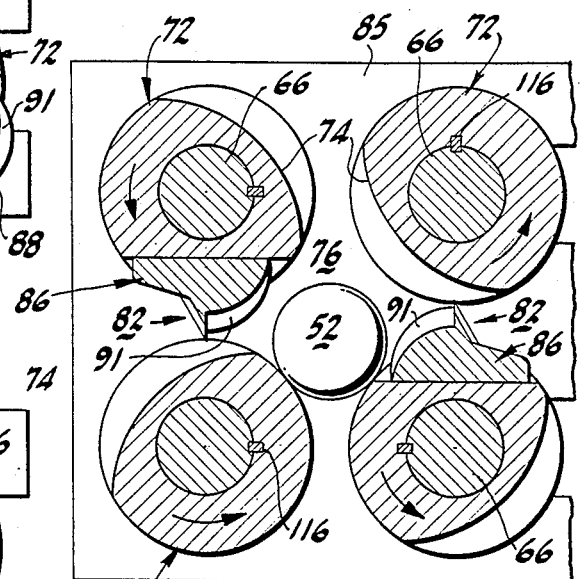
FIG.-5
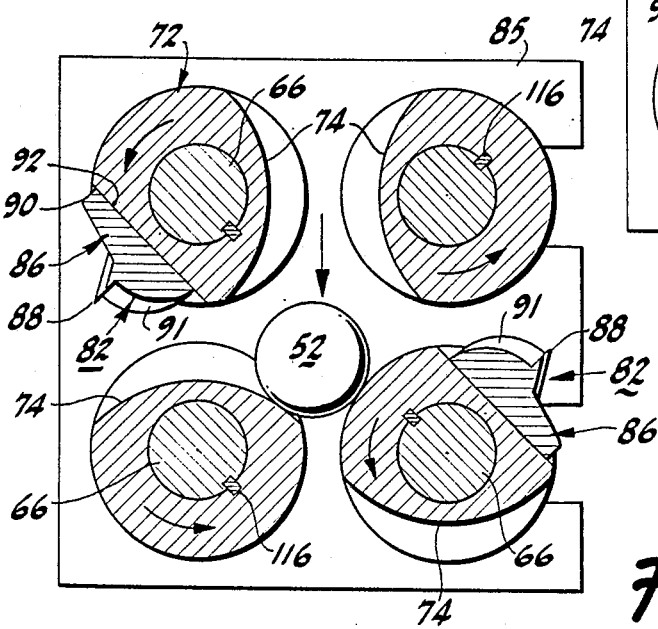
FIG.-4

NUT SHELLING MACHINE

BACKGROUND OF THE INVENTION

This invention relates to a machine for shelling nuts and in particular to a multi-shaft mechanism for entrapping individual nuts for pressure cracking or shear splitting, depending on the type of nut to be shelled.

Prior art nut shelling devices utilize impact means or pressure rollers for crushing nuts. In general such devices shatter the nuts creating many small pieces of shell that must be separated from the meat, much of which may be broken. Since a premium is generally placed on shelled, whole nuts, these techniques not only create problems in separating meat from shell, but diminish the value of the product.

Certain nuts such as the macadamia nut have extremely tough shells with kernels that demand a substantial premium when whole. The nuts are relatively round in configuration and are often graded according to size before being shelled by crushing between two precisely spaced counter-rotating drums. Because of the force required to crack the nuts, often the kernels are broken as the thick brittle shell shatters. Frequently, the kernel or a substantial portion of the kernel remains lodged in the shell requiring further cracking to recover the meat or resulting in losses, if the retained meat is discarded with the shell. Other nuts such as walnuts have an oblong configuration with shells that are brittle and of varying thickness at different parts of the shell resulting in mixed results when cracked by impact or roller devices.

It has been discovered that various nuts lend themselves to different techniques for improved shelling, if the nut can be properly positioned and contacted by select shelling implements adapted to the particular nut. It has been known, for example, that upon positioning a walnut on end and impacting the opposite end, the shell will split generally leaving an unbroken kernel. However, design of a continuous process that will shell commercial quantities of nut using an individual nut positioning technique has eluded designers.

It is therefore a principal object of this invention to provide a nut shelling machine that entraps and orients individual nuts for action by select contact implements, and which can accomplish this task on a commercial scale with relatively simple components.

In one of the preferred embodiments this machine is provided with contact implements that splits and separates shells from the kernel and is particularly designed for shelling the tough macadamia nut and other round thick shell nuts. In another embodiment the machine is provided with contact implements that engage and compress the ends of a nut with or without cutting blades, and is particularly designed for shelling the brittle walnut and other oblong nuts.

SUMMARY OF THE INVENTION

The nut shelling machine of this invention is designed and constructed to operate with select contact implements designed to shell different nuts. Common to the design is a mechanism that accepts, entraps, shells and releases individual nuts in a sequence that is tailored to the particular nut and designed to maximize the quantity of shelled whole kernels. Furthermore, the mechanism is designed to maximize the size of the split shell pieces to ease the task of separating meat from shell and minimize losses resulting from small commingled bits and pieces of shell and meat.

The machine in its preferred embodiments includes a drive motor and a gear box for rotating four juxtaposed shafts positioned in side by side pairs of upper and lower aligned shafts.

Along each shaft is a series of cam indentions which are angularly disposed on the adjacent pairs of the upper and lower shafts such that the indentions are periodically coincident in an opposed arrangement that enlarges the effective space between adjacent shafts. This periodic effective enlargement between the shafts is designed to permit a single nut to drop between the upper pairs of shafts and then drop between the lower pairs of shafts. By adjusting the phase or lag time of the rotation of the lower shafts, the enlarged opening between the lower shafts can occur a specified time after the upper opening has occurred to provide an opportunity to act on the entrapped nut before release.

In the preferred embodiments the shafts each have multiple cam-loke indentions forming a series of discrete shelling stations along the shaft. The shelling stations are separated by dividers and are angularly staggered around the shaft to permit a string of nuts to be shelled in a smooth, low-impact sequence with minimal power demand.

Preferably, for maximum yield, the nuts should be presized and supplied to the shelling machine by a hopper that stream feeds the discrete, multiple stations along the extended shafts. One of the side by side pairs of shafts is displaceable such that the distance between one pair of upper and lower shafts can be adjusted relative to the other pair of upper and lower shafts. In this manner the machine can be adjusted for optimum operation for the particular size-graded nut.

In the preferred embodiment, the machine is adapted to shell the difficult macadamia nut by incorporation of opposed pairs of splitting blades mounted in diagonally opposed shafts. The splitting blades are arranged and shaped with a curved lead-edge to engage the spherical nut entrapped between the pairs of lower and the upper shafts. Since the shafts rotate in the same direction the relative tangential motion of the blades during occlusion is opposite. As the shafts rotate the nut shell is impaled by the lead edges as the blades move toward one another, is penetrated a predetermined depth with a wedge action as the blades reach their most proxical position, and is shear split as the blades regress. When the blades pass, the indentions of the lower shafts align, allowing kernel and shell to drop to auxiliary equipment for separating shell from kernel.

In another embodiment the machine is adapted to shell a walnut by incorporation of opposed pairs of circular discs engaged by the four shafts in eccentric cam grooves around each shaft. The circular discs are maintained in parallel planes with a common perpendicular axis that is parallel to the axis of the shafts. The spaced discs, entrapped between the pairs of shafts track in the grooves in an oscillating manner that enlarges and contracts the spacing between the discs. A nut that drops between the upper shafts and orients its oblong configuration axially on the pair of lower shafts when the discs are maximally spaced, in split by impact of the discs as they move toward one another. Again, immediately following, the space between lower discs enlarges and the meat and shell drop to auxiliary processing equipment below. The use of the discs can be with or without cutting blades.

These and other features will become apparent from a consideration of the detailed description of the preferred invention.

BRIEF DESCRIPTION OF THE DRAWINGS

FIG. 1 is a side elevational view, partially fragmented of the nut shelling machine.

FIG. 2 is an end view, partially fragmented, taken along lines 2.2 and FIG. 1.

FIG. 3 is a cross sectional view of the rotary feed mechanism and the four shaft shelling mechanism of a first embodiment of the invention.

FIG. 4 is a cross sectional view of a portion of the mechanism of FIG. 3 in a second sequential position.

FIG. 5 is a cross sectional view of the mechanism in a third sequential position.

DETAILED DESCRIPTION OF THE PREFERRED EMBODIMENTS

Figure 6:
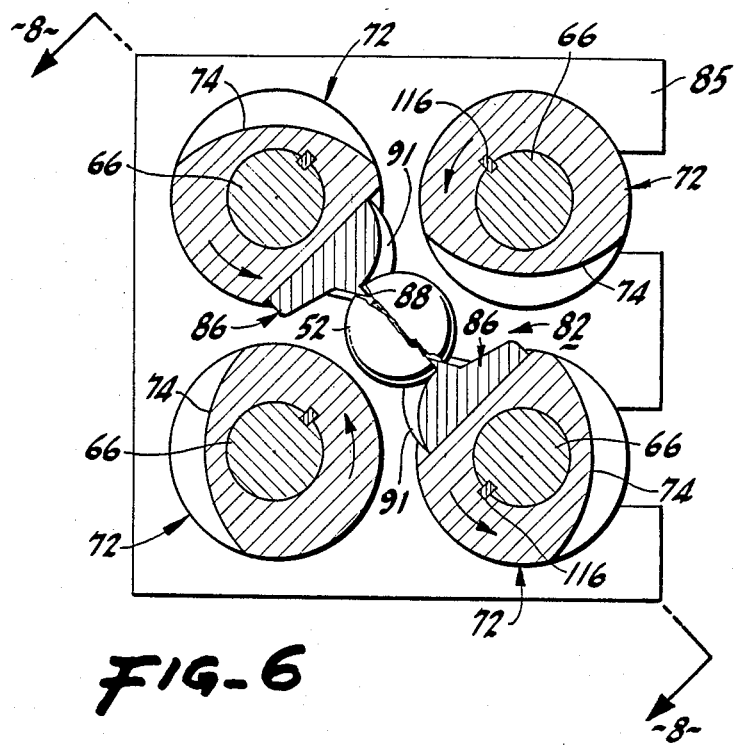
FIG. 6 is a cross sectional view of the shelling mechanism in the fourth sequential position.

Referring now to FIG. 1 the invented nut shelling machine, designated generally by the reference numeral 10, is shown with a base platform 12 on which it is mounted, a variable speed-drive motor 14 connected by coupling 16 to a gear box 18 that transforms the single input spindle 20 to multiple output spindles 22. The output spindles 22 includes four shelling spindles 24 which are rotated at the same rotational speed, and a feed mechanism spindle 26 which is rotated at one-half the speed of the shelling spindles in the particular embodiments shown. The output spindles shown are all connected by couplers 28 to universal drive shafts 30 to allow adjustments between the gear box 18 and a shelling unit 32.

The shelling unit 32 includes a feed mechanism 34 and a shelling mechanism 36. The arrangement of the single shaft feed mechanism 34 and the four shaft shelling mechanism 36 are also shown in FIG. 2. The feed mechanism 34 is constructed with a frame 38 with end walls 40 including journal bearings 42 for a feed shaft 44. On the feed shaft 44 is a concentric drum 48 having a series of pocket recesses 50 for discreetly selecting and depositing nuts 52 from an inclined feed tray 54 to the shelling mechanism 36. The recesses 50 are separated by dividers 56 into a series of discrete feed stations 58.

As shown in FIG. 2 and 3 each feed station 58 has two opposed recesses spaced 180° from each other in the surface of the drum 48. This arrangement enables one nut to be deposited into the shelling mechanism while the next sequential nut is being collected from the feed tray. In this manner the feed shaft 44 can be operated at one half the rotational speed relative to the rotation in the shelling mechanism while maintaining the coordinated pace of shelling. The slower pace of the feed mechanism allows for improved seating of a nut in a recess without being knocked away by the impact of a rapidly moving drum 48. The sleeve tray 54 is supplied by a conventional bulk hopper (not shown) which deposits nuts on the feed tray as the supply on the tray is depleted. Other feed mechanism designs can be used in this invention.

The shelling mechanism 36 includes a frame 60 with end walls 62 having journal bearings 64 for four shelling shafts 66 arranged in a side-by-side upper pair and a side-by-side lower pair positioned directly below the upper pair. The feed mechanism 26 is structurally fixed to the shelling mechanism 36 by a bracket 68 such that the dispensing drum 48 is positioned to deposit a collected nut between the upper pair of shelling shafts 66.

As shown in FIG. 3, the shelling shafts 66 each have a connected cam 72 with a surface indention 74 strategically oriented on the shaft to allow a periodic enlargement and contraction of the effective space between pairs of side by side shafts. The angular position of the indention 74 is best described with relationship to the operating sequence shown in FIGS. 3-14 7. It is to be understood that the cam and indention arrangement is suitable for both of the principal embodiments disclosed, however, the particular sequence of IGS. 3-7 includes cutting knives not necessarily common to both embodiments.

Figure 7:
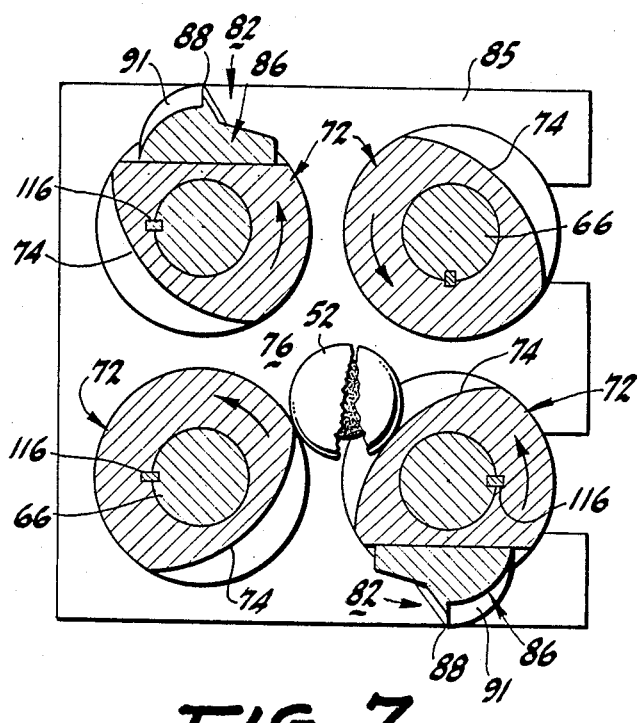
FIG. 7 is a cross sectional view of the shelling mechanism in the fifth sequential position.

Referring to FIG. 3, as a nut drops from the pocket recess 50 of the distribution drum 48 it is blocked from entry into a trap area 76 by the lobes 78 of the cams 72 on the two upper shafts 66 until the shelling mechanism has dispensed with the previous nut. As indicated by the direction of rotation, the surface indentions 74 will align allowing the nut to drop between the two cams 72 into the trap area 76 of a particular shelling station 80. As shown in FIG. 3 the previous nut 52 with its split shell will drop between the aligned indentures 74 of the two lower shafts leaving the trap area 76 free to accept the arriving nut. As shown in FIGS. 4 and 5 the newly arrived nut is trapped in the trap area 76 until acted upon by a shelling implement 82. The nut remains trapped until the implement 82 has completed its task and the shelled nut is ready to drop between the aligning indentions 74 as shown in FIG. 7. A moment subsequent to the positioning of the cams as shown in FIG. 7, the sequence arrives at the position of FIG. 3 where the cycle begins once again.

In order to prevent the impact of the shelling implements 82 from occurring simultaneously along all of the shelling stations 84, the recesses in the feed drum and the surface indentions on the cams of the shelling shafts are arranged in a staggered phase, for example a 60° shelling shaft phase for a six station system with a 30° feed shaft phase, since the feed shaft rotation is one-half that of the shelling shafts. Not only is the operation smoother, but the power requirements for the drive motor are substantially reduced.

Figure 8:
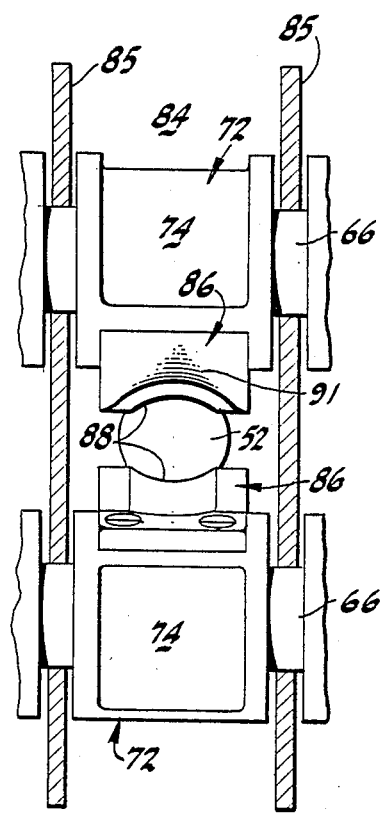
FIG. 8 is a cross sectional diagonal view taken along lines 8—8 of end FIG. 6.

As shown in FIG. 8, the shelling stations 84 are separated from one another by stationary dividers 85 through which the shelling shafts 66 are installed during assembly In the preferred embodiments of the nut shelling machine 10, the shelling implement 82 comprises a pair of shell splitting blades 86, each having a curve leading edge 88 that protrudes from a base 90 that seats on a flat 92 in two diametrically opposed cams 72. The embodiment with two cutters bolted on diagonally opposed shelling shafts 66 is designed for shelling the spherical macadamian nuts by a unique cutting and prying action that splits the shell open and separates the whole kernel from the split shell. Each of the splitting blades 86 is fabricated with the base 90 forming a raised pocket 91 that seizes and positions the nut immediately prior to penetration of the blades leading edge 88. Because the two opposed splitting blades 86 are travelling in a relative opposite direction, in addition to the axial penetration, a tangential shear force is applied to pry apart the split shell and preserve the kernel in a whole condition. The unique cutting and prying action that breaks open the shell with a combination of tension and compression action instead of all compression, lowers the necessity of an excess of cracking force, thereby opening the nut with less energy and greatly reducing the meat damage and leaving larger, more manageable shell pieces.

The curved shaped of the lead edge 88 of the splitting blades 86, as shown in FIG. 8, is designed to penetrate the shell to a predetermined depth. Since this penetration depth should be closely controlled in order to have a uniform cracking action, adjustment means are provided in the shelling mechanism to vary the distance between side-by-side pairs of shelling shafts to accommodate different sizes of the pregraded nuts. As shown in FIG. 2, the outer pair of shelling shafts are mounted in a displaceable plate 94 in each of the end walls 40 of the frame 38. The displaceable plates 94 are connected to the end walls 40 by a series of pans 96 having threaded ends 98 and drive heads 100 allowing engagement of a drive tool for adjusting the position of the displaceable plate 94. Positioning of the plate determines the spacing between the cutting blades on the diagonally opposed shelling shafts. This spacing determines the depth to which the blades penetrate the nut shell and therefore is coordinated with the size of the grated nut in order to maximize the successful shelling of the nuts.

Figure 9:
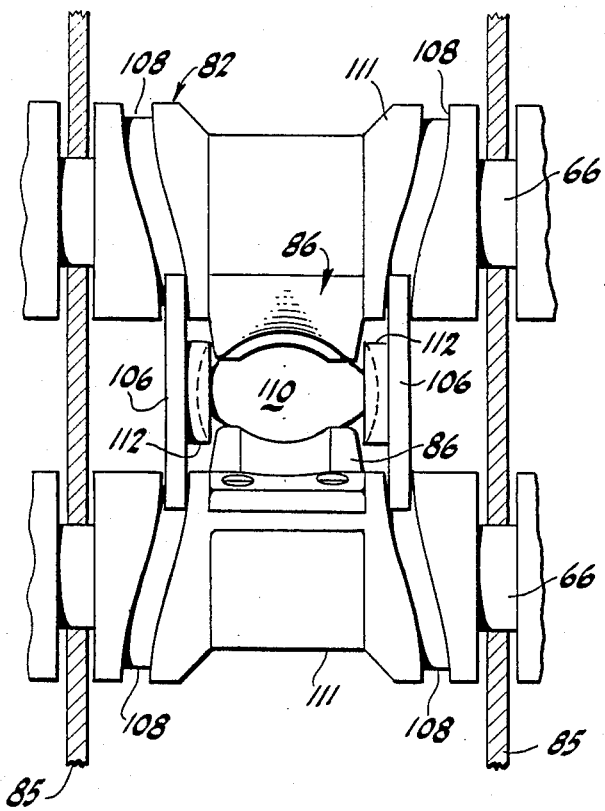
FIG. 9 is a dramatic view of an alternate shelling mechanism for the shelling machine of FIG. 1.
Figure 10:
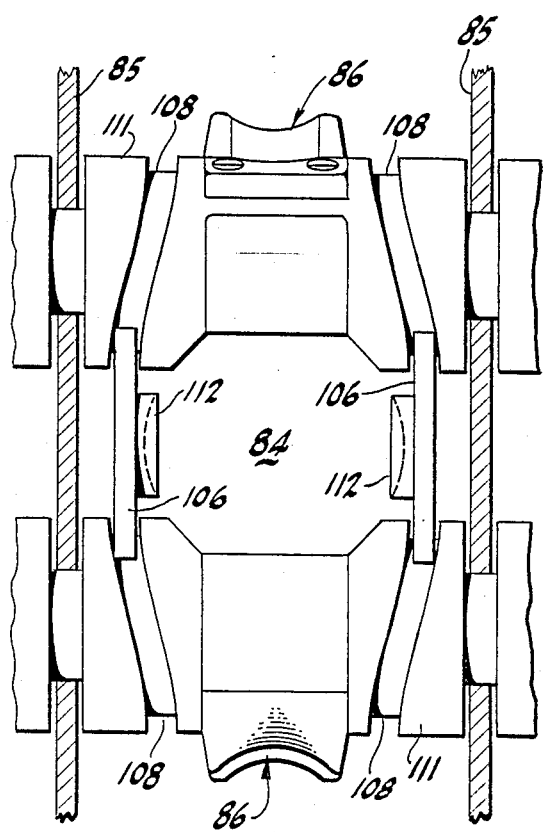
FIG. 10 is a second sequential position of the alternate shelling mechanism of FIG. 9.

Referring now to FIGS. 9-10, an alternate shelling mechanism is schematically shown. The shelling implement 82 in this embodiment comprises a pair of spaced discs 106 which are trapped between the four shelling shafts 66, the lower two of which are shown in the FIGS. 9 & 10. The discs are retained in a mutually opposed paralled planer position by riding in grooves 108 in sleeves 111 on the shafts, the grooves being obliquely or eccentrically arranged around the shafts to provide an oscillating back and forth movement between the two discs 106. This arrangement is particularly useful for oblong nuts 110 which can be successfully cracked by impact on the opposite ends 112 with or without the use of supplemental blades. The discs 106 have a cupped contact boss 112 which helps position and contain the nuts during the impact cracking. Where the nuts have been graded and smaller nuts are to be cracked, the discs 106 can be replaced with similar discs in which the bosses have a greater projection from the surface of the disc and therefore result in an effective reduction in the space between the oscillating discs.

It is to be understood that the oscillating disc is operated with the cam trap arrangement, and may use diagonally opposed cutting blades, particularly where the nut has a thin deformable shell in which a pressure on the ends of the nut will prevent deformation of the girth when the cutting blades contact the outer surface of the shell. Similarly, in certain types of nuts it may be more advantageous to employ four cutting blades instead of the two cutting blades preferred in the cutting of the macadamian nuts. While the cam style trap and release system is common to both of the embodiments described it is to be understood that certain modifications of the construction of the cam surfaces necessary to incorporate the oscillating discs in the shaft arrangements. For example, the projecting bosses are necessary not only to allow for adjustment between the effective spacing between the oscillating discs for different size nuts, but are necessary to insure that the tracking grooves do not coincide with the cam indentions. The greater spacing needed for each shelling station would thereby reduce the effective number of shelling stations in a shelling machine when the discs implements are included.

The cams 72 in the first embodiment and the sleeves 111 in the second embodiment comprise enlargements that are mounted on the shafts with keys 116 for easy removal and replacement, or, for changing the shelling mechanism from one operational embodiment to another.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A nut shelling machine comprising:
   a rotary drive mechanism;
   a shelling mechanism having a frame and four shelling shafts connected to the rotary drive mechanism arranged in spaced upper and lower, side by side pairs, the shelling shafts and frame including at least one shelling station;
   a nut feed mechanism having dispensing means arranged with the shelling mechanism for periodic delivery of individual nuts to the shelling station;
   means on the upper and lower pairs of the shelling shafts for periodically enlarging and contracting the effective space between the shelling shafts of the upper pair and for periodically enlarging and contracting the effective space between the shelling shafts of the lower pair on coordinated rotation of the shelling shafts by the drive mechanism, said means being arranged such that an individual nut dispensed by the feed mechanism passes between the pair of upper shafts, is subsequently trapped between the pair of upper shafts and lower shafts and finally passes between the pair of lower shafts; and,
   a periodic shell splitting means arranged with said shaft for splitting the shell of a nut when trapped between the upper shafts and lower shafts.

2. The nut shelling machine of claim 1 wherein the enlarging and contracting means on the shafts comprise surface lobes and indentions on the shafts, wherein the indentions in the upper pair and in the lower pair are located for opposed juxtaposition on each rotation of the shafts in a timed sequence.

3. The nut shelling machine of claim 2 wherein the surface lobes and indentions are formed in cam-like enlargements mounted on said shafts.

4. The nut shelling machine of claim 3 wherein the cam-like enlargements include, on at least two diametrically opposite shafts, cutting blades which have an opposed, periodic orientation and mutually engage a nut trapped between the upper shafts and lower shafts.

5. The nut shelling machine of claim 4 wherein the cutting blades have a base and a curved leading edge, the base having a curved configuration to the leading edge adapted to engage and retain a nut between the opposed blades for splitting the nut shell using a penetrating and prying action by the lead edge of the cutting blades.

6. The nut shelling machine of claim 3 wherein the cam-like enlargements include cutting blades on all four shafts, arranged for substantially simultaneous engagement of a nut trapped between the upper shafts and lower shafts.

7. The nut shelling machine of claim 3 wherein the enlargements comprise cam sleeves with pairs of eccentric grooves around the sleeves, and wherein the shell splitting means comprises a pair of discs engaged in the grooves, the grooves and discs being arranged to impart an oscillating back and forth motion between parallel positioned discs, wherein a nut trapped between the upper shafts and lower shafts and between the pair of discs is impacted on opposite ends by the discs.

8. The nut shelling machine of claim 7 wherein the discs each have a central base projecting a predetermined distance from the disc for a particular sized nut.

9. The nut shelling machine of claim 7 wherein the cam sleeves include, on at least two diametrically opposite shafts, cutting blades which have an opposed, periodic orientation and mutually engage a nut trapped between the upper shafts and lower shafts.

10. The nut shelling machine of claim 9 wherein the cam sleeves include cutting blades on all four shafts, arranged for substantially simultaneous engagement of a nut trapped between the upper shafts and the lower shafts.

11. The nut shelling machine of claim 1 wherein the rotary feed mechanism is connected to the rotary drive mechanism, the dispensing means of the rotary feed mechanism comprising a drum having at least one pocket for collecting and dispensing a nut on rotation of the drum.

12. The nut shelling machine of claim 11 wherein the feed mechanism includes an incline feed tray with a delivery end directed relative to the drum for sequential delivery of nuts to the pocket of the drum.

13. The nut shelling machine of claim 1 having a plurality of shelling stations.

14. The nut shelling machine of claim 13 wherein the feed mechanism and shelling mechanism are coordinated such that nuts at each shelling station are split in a timed sequence for minimizing power requirements in the drive mechanism.

15. The nut shelling machine of claim 1 wherein the rotary drive mechanism includes a variable speed drive motor and a gear box with a multiple spindle output.

16. The nut shelling mechanism of claim 15 wherein the four shaft shelling mechanism is connected to the multiple spindle output of gear box of the drive mechanism by shafts having a universal joint.

17. The nut shelling mechanism of claim 1 wherein one pair of upper and lower shafts of the shelling mechanism is displaceable from the other pair of upper and lower shafts and wherein the shelling means includes adjustment means for displacing one pair of upper and lower shafts from the other pair of upper and lower shafts to vary the effective distance between shafts wherein the shelling machine can accommodate different graded sizes of nuts.

* * * * *